United States Patent
Vashisht

(10) Patent No.: US 11,902,347 B2
(45) Date of Patent: Feb. 13, 2024

(54) DETECTING AND MANAGING INTERRUPTIONS TO PARTICIPANTS OF AN ONLINE MEETING

(71) Applicant: Cisco Technology, Inc., San Jose, CA (US)

(72) Inventor: Vikas Vashisht, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 176 days.

(21) Appl. No.: 17/675,527

(22) Filed: Feb. 18, 2022

(65) Prior Publication Data

US 2023/0269287 A1   Aug. 24, 2023

(51) Int. Cl.
*H04L 65/613*   (2022.01)
*G06F 3/16*   (2006.01)
*G06V 40/16*   (2022.01)
*H04L 65/403*   (2022.01)

(52) U.S. Cl.
CPC ............ *H04L 65/613* (2022.05); *G06F 3/16* (2013.01); *G06V 40/172* (2022.01); *H04L 65/403* (2013.01)

(58) Field of Classification Search
CPC ..................................................... H04L 65/613
See application file for complete search history.

(56) References Cited

U.S. PATENT DOCUMENTS

| | | |
|---|---|---|
| 6,766,035 B1 | 7/2004 | Gutta |
| 7,123,745 B1 | 10/2006 | Lee |
| 9,069,604 B2 * | 6/2015 | Plotkin ..................... G06F 9/44 |
| 10,076,705 B2 * | 9/2018 | Deshpande .......... G06V 40/167 |
| 2010/0103241 A1 | 4/2010 | Linaker |
| 2011/0274315 A1 | 11/2011 | Fan et al. |
| 2021/0274128 A1 | 9/2021 | Lu et al. |
| 2023/0033595 A1* | 2/2023 | Shetty .................. G06F 40/166 |

* cited by examiner

*Primary Examiner* — Olisa Anwah
(74) *Attorney, Agent, or Firm* — Edell, Shapiro & Finnan, LLC

(57) ABSTRACT

In one example embodiment, a user conducting an activity is monitored by capturing information of the user and a surrounding environment via one or more sensing devices. The captured information includes images. The captured information is analyzed by a computing device, and one or more interruptions to the user during the activity by one or more entities in the surrounding environment are identified. The identified one or more interruptions to the user are presented on a user interface after completion of the activity.

20 Claims, 8 Drawing Sheets

DETECTING AND MANAGING INTERRUPTIONS TO PARTICIPANTS OF AN ONLINE MEETING

TECHNICAL FIELD

The present disclosure relates to on-line meetings.

BACKGROUND

People may attend consecutive online meetings for the duration of a workday. Participants of an online meeting may be located at home or in an office, but at least some of the meeting participants are typically remote. This results in people transitioning from one online meeting to another without having breaks in between. Often, participants are interrupted during these online meetings by family or colleagues desiring a meeting participant's attention for short time intervals to discuss a topic of importance. In some cases, a person seeking the attention of a meeting participant may simply approach the meeting participant and withdraw without the meeting participant even noticing the person.

If the meeting participant notices the person seeking attention, the meeting participant typically gestures or indicates to the person that the meeting participant is attending an online meeting and will respond after conclusion of the meeting. However, as soon the online meeting ends, the meeting participant views an indicator or actuator for a next online meeting. The meeting participant typically joins the next online meeting while forgetting about responding to the person seeking attention until a later time of the day. The interruptions most often are of short duration and pertain to important matters, and delaying response to the person seeking attention may lead to loss of productivity, or may result in the person missing deadlines or feeling inferior.

These situations may be handled by the person seeking attention sending an instant messaging (IM) or short message service (SMS) message to the meeting participant, and hoping that the meeting participant notices the message between online meetings and responds. However, the meeting participant is simply engaged and typically attends consecutive online meetings without noticing the message. Although personal assistants may help manage these interruptions, not everyone is able to be afforded a dedicated personal assistant.

DESCRIPTION OF EXAMPLE EMBODIMENTS

Overview

In one example embodiment, a user conducting an activity is monitored by capturing information of the user and a surrounding environment via one or more sensing devices. The captured information includes images. The captured information is analyzed by a computing device, and one or more interruptions to the user during the activity by one or more entities in the surrounding environment are identified. The identified one or more interruptions are presented to the user on a user interface after completion of the activity.

Example Embodiments

An example embodiment captures an interruption to a participant of an online meeting by a person seeking their attention, and reminds the meeting participant to contact the person seeking attention at conclusion of the online meeting (and preferably prior to a next meeting). The example embodiment may recognize interruptions to the participant of the online meeting from colleagues and family by employing a camera and/or one or more microphones coupled to an endpoint device of the meeting participant used for the online meeting. Information pertaining to the interruptions are presented to the meeting participant at conclusion of the online meeting (and preferably prior to a next meeting). In other words, the example embodiment provides a manner for a participant of an online meeting to acknowledge people seeking the meeting participant's attention during the meeting, and issues a reminder to the meeting participant to contact those people when the meeting ends.

While the present embodiments are described with respect to detecting and managing interruptions to participants of an online meeting, it will be appreciated that the interruptions may be detected and managed for users performing or engaging in other activities with, or in proximity of, a computing device in substantially the same manner described below (e.g., using an application on the computing device, reviewing documents, conducting a call from the computing device or from a calling device in proximity of the computing device, etc.). An interruption may include any impediment, discontinuity, disruption, delay, distraction, interference, and/or any other hindrance (or potential hindrance) for any period of time with respect to a user performing an activity. The interruption may be caused by any physical or other action of the user, and/or by any physical or other action of other entities (e.g., persons, animals, etc.) seeking or intending to divert a user attention, gaze, performance, concentration, and/or focus away from the activity for any period of time.

Figure 1:
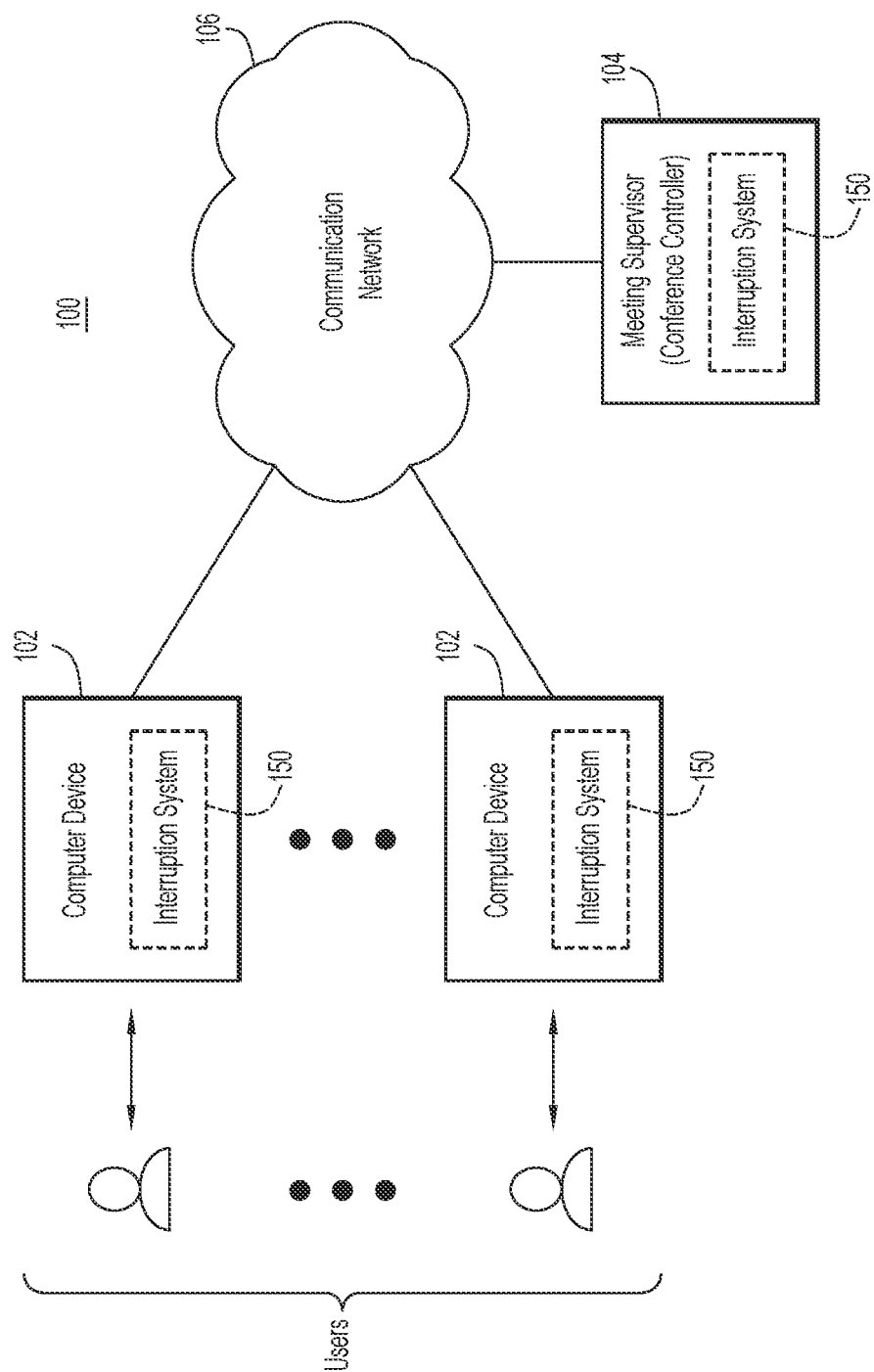
FIG. 1 is a block diagram of an example online meeting environment in which detection and management of interruptions to meeting participants may be implemented, according to an example embodiment.

FIG. 1 illustrates a block diagram of an example online meeting environment 100 in which an embodiment presented herein may be implemented. Environment 100 includes multiple computer devices 102 (collectively referred to as computer devices, participant devices, or platforms) operated by local users/participants, a meeting supervisor or server (also referred to as a "conference controller") 104 configured to support online (e.g., web-based or over-a-network) collaborative meetings between the computer devices, and a communication network 106 communicatively coupled to the computer devices and the meeting supervisor. Computer devices 102 can take on a variety of forms, including a smartphone, tablet, laptop computer, desktop computer, video conference endpoint, and the like.

Communication network 106 may include one or more wide area networks (WANs), such as the Internet, and one or more local area networks (LANs). Computer devices 102 may communicate with each other, and with meeting supervisor 104, over communication network 106 using a variety of known or hereafter developed communication protocols. For example, the computer devices 102 and meeting supervisor 104 may exchange Internet Protocol (IP) data packets, Realtime Transport Protocol (RTP) media packets (e.g., audio and video packets), and so on.

Computer devices 102 may each host an online meeting application used to establish/join online meetings and an interruption system 150. According to embodiments presented herein, when a computer device 102 joins an online meeting under control of the online meeting application, interruption system 150 of the computer device can detect and manage interruptions to a user of the computer device detected by a camera and/or one or more microphones coupled to the computer device as described below. In an embodiment, meeting supervisor 104 or other server system coupled to communication network 106 may host interruption system 150 to detect and manage interruptions to a user of a computer device 102 in substantially the same manner described below. In this case, interruptions detected by the camera and/or one or more microphones coupled to the computer device may be provided to interruption system 150 on meeting supervisor 104 for processing, and the results are provided to the computer device for presentation to the user.

Figure 2:
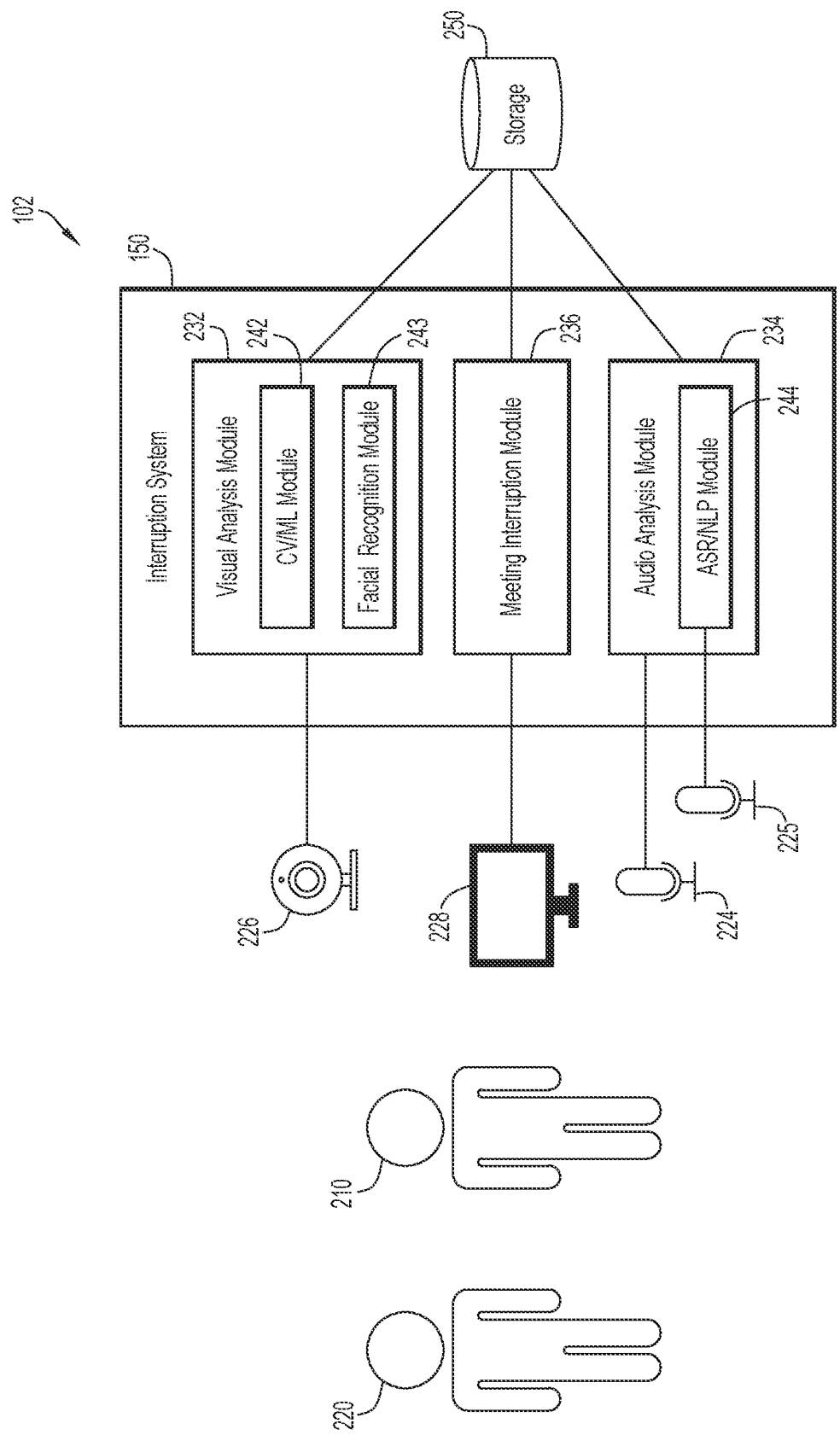
FIG. 2 illustrates a block diagram of a system configured for detecting and managing interruptions to a participant of an online meeting, according to an example embodiment.

FIG. 2 illustrates interruption system 150 implemented on a computer device 102 and configured for detecting and managing interruptions to a participant of an online meeting, according to an example embodiment. While FIG. 2 is described with respect to detecting and managing interruptions to a participant of an online meeting, it will be appreciated that the interruptions may be detected and managed for a user performing or engaging in other activities with, or in proximity of, computer device 102 in substantially the same manner described below (e.g., using an application on computer device 102, reviewing documents, conducting a call from computer device 102 or from a calling device in proximity of computer device 102, etc.).

Initially, computer device 102 enables a user 210 to join an online meeting. In an embodiment, computer device 102 includes a camera or other image capture device 226 to capture images (e.g., still images, video, etc.) of user 210 and a surrounding environment, a microphone or other sound sensing device 224 to capture sound of the surrounding environment and produce audio information, and a display or monitor 228 to present meeting content to user 210. Since microphone 224 may be deactivated during portions of the online meeting (e.g., user 210 may become muted, etc.), an additional microphone or other sound sensing device 225 that remains active may be coupled to computer device 102. An entity 220 (e.g., person, animal or pet, etc.) may interrupt user 210 during the meeting. The interruption may be detected and managed by interruption system 150.

Interruption system 150 includes a visual analysis module 232, an audio analysis module 234, and a meeting interruption module 236. Camera 226 captures visual information including images (e.g., still images, video, etc.) of user 210 and the surrounding environment, and provides the captured visual information to visual analysis module 232 (e.g., and to a meeting or other application, etc.). The visual analysis module includes a computer vision (CV)/machine learning (ML) module 242 and a facial recognition module 243. Visual analysis module 232 may analyze the captured visual information and detect various scenarios that represent an interruption to user 210. The scenarios include actions, gestures, and/or facial or other reactions of user 210 and/or entity 220 to indicate an interruption. Analyzing the visual information for the facial or other reactions of user 210 and/or entity 220 reduces false positives with respect to detection of interruptions.

For example, visual analysis module 232 may detect an interruption scenario of entity 220 approaching user 210, pausing, looking at user 210 and/or monitor 228, noticing that user 210 is participating in a meeting, and subsequently withdrawing. By way of further example, visual analysis module 232 may detect interruption scenarios of entity 220 having a brief conversation with user 210, and/or one or more persons peeking in or entering a room of user 210 and gesturing for attention. Further, visual analysis module 232 may detect an interruption scenario of user 210 turning around or to their side, and gesturing to, or speaking with, entity 220 located within or outside a view of camera 226. Moreover, visual analysis module 232 may ignore entities working or passing by user 210, and may further employ facial recognition module 243 to perform facial recognition and determine an identity of entity 220 or other entities in the background. In addition, visual analysis module 232 may detect an interruption scenario triggering an alert of entity 220 or other entities being behind user 210 without being noticed (e.g., when a self-view feature of an online meeting is disabled, when one or more entities in the background are covered by a virtual background and the system accesses original video to detect the entities in the background, etc.).

Computer vision (CV)/machine learning (ML) module 242 may detect or classify a scenario within captured visual information as an interruption, and may employ any conventional or other techniques for computer vision and/or machine learning (e.g., detecting user gaze, detecting user focus or attention, detecting user reaction, etc.). CV/ML module 242 may include any conventional or other machine learning models (e.g., mathematical/statistical, classifiers, feed-forward, recurrent, convolutional or other neural networks, etc.) to detect and classify scenarios. In an embodiment, CV/ML module 242 may employ a neural network. For example, neural networks may include an input layer, one or more intermediate layers (e.g., including any hidden layers), and an output layer. Each layer includes one or more neurons, where the input layer neurons receive input (e.g., image/video information, feature vectors of image/video, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the neural network may be performed using a training set of images/video information as input and corresponding classifications as outputs, where the neural network attempts to produce the provided output (or classification) and uses an error from the output (e.g., difference between produced and known outputs) to adjust weight (and bias) values (e.g., via backpropagation or other training techniques).

In an embodiment, images/video of scenarios and their known corresponding classifications (e.g., an interruption without triggering an alert, no interruption, an interruption triggering an alert, etc.) may be used for the training set as input. In an embodiment, feature vectors may be extracted from the images/video and used with the known corresponding classifications for the training set as input. A feature vector may include any suitable features of the images/video (e.g., person features/dimensions, pixel features, etc.). In other words, images/videos known to indicate interruptions that do not trigger an alert, known to indicate no interruptions, and known to indicate interruptions that trigger an alert may be used for training the neural network. For example, images/videos of scenarios indicating presence of an interruption that does not trigger an alert may include: an entity approaching a participant, pausing, looking at the participant and/or participant's monitor, noticing that the participant is participating in a meeting (e.g., facial or other reaction), and subsequently withdrawing; an entity having a brief conversation with the participant; one or more persons peeking in or entering a room of the participant and gesturing for attention; and the participant turning around or to their side, and gesturing to, or speaking with, an entity located within or outside a view of a camera or image capture device. Images/videos of scenarios indicating absence of an interruption may include entities working or passing by the participant. In addition, images/videos of scenarios indicating presence of an interruption that triggers an alert may include an entity being behind the participant without being noticed. However, the training set may include any desired images/videos of any scenarios of the different classes to learn the characteristics (e.g., actions or motions, gestures, reactions, etc.) for detecting interruptions.

The output layer of the neural network indicates a classification (e.g., interruption that does not trigger an alert, no interruption, interruption that triggers an alert, etc.) for input data. By way of example, the classes used for the classification may include a class associated with the presence of an interruption that does not trigger an alert, a class associated with the absence of an interruption, and a class associated with the presence of an interruption that triggers an alert. The output layer neurons may provide a classification (or specify a particular class) that indicates a presence and type (e.g., with or without an alert) of an interruption or absence of an interruption within input data. Further, output layer neurons may be associated with the different classes indicating the presence and type (e.g., with or without an alert) of interruptions or absence of interruptions, and indicate a probability for the input data being within a corresponding class (e.g., a probability of the input data being in a class associated with a presence of an interruption that does not trigger an alert, a probability of the input data being in a class associated with an absence of an interruption, a probability of the input data being in a class associated with a presence of an interruption triggering an alert, etc.). The class associated with the highest probability is preferably selected as the class for the input data. In other words, when the class indicating presence of an interruption that does not trigger an alert is associated with the highest probability, an interruption is initially considered to be present in the input data (e.g., captured images/video of user 210, etc.).

Facial recognition module 243 may analyze the visual information pertaining to an interruption (e.g., that does not trigger an alert) detected by computer vision (CV)/machine learning (ML) module 242 and determine an identity of an entity interrupting user 210. Facial recognition module 243 may employ any conventional or other mechanisms to perform the facial recognition (e.g., conventional or other facial recognition applications, etc.). For example, facial recognition module 243 may employ a machine learning model to perform the facial recognition. The facial recognition machine learning model may be implemented by any conventional or other machine learning models (e.g., mathematical/statistical, classifiers, feed-forward, recurrent, convolutional or other neural networks, etc.). By way of example, the facial recognition may be performed by a neural network substantially similar to the neural network described above. In this example case, the machine learning may be performed using a training set of image information for different persons to be recognized as input and known corresponding classifications (or identities) as outputs, where the neural network attempts to produce the provided output (or classification/identity). In an embodiment, the images and corresponding known identities may be used for the training set as input. In an embodiment, feature vectors may be extracted from the images and used with the corresponding known identities for the training set as input. A feature vector may include any suitable features (e.g., person features/dimensions, pixel features, etc.).

The output layer of the neural network indicates a classification (e.g., identity, etc.) for input data. By way of example, the classes used for the classification may include a class associated with each identity. The output layer neurons may provide a classification that indicates a specific identity of an entity within input data. Further, output layer neurons may be associated with the different classes or identities, and indicate a probability for the input data being within a corresponding class (e.g., a probability of the input data being associated with a corresponding identity, etc.). The class or identity associated with the highest probability is preferably selected as the class or identity for the input data.

Visual analysis module 232 analyzes the output of the machine learning model of computer vision (CV)/machine learning (ML) module 242 (e.g., classification, probability, etc.) to determine a presence of a scenario representing an interruption. When an interruption is detected, visual analysis module generates and transmits an event (or notification) to meeting interruption module 236 indicating the presence of the interruption and the type of interruption with respect to triggering an alert. The event (or notification) may include a timestamp or other time indicator for retrieval and synchronization of the visual information with corresponding audio information of the interruption. In addition, when the interruption does not trigger an alert, visual analysis module 232 provides the captured visual information to facial recognition module 243 to determine an identity of an entity in the background or initiating the detected interruption. The determined identity may be provided to meeting interruption module 236 when determined from facial recognition module 243.

Microphones 224 and/or 225 capture sound and produce audio information of user 210 and the surrounding environment (e.g., speech, voice, etc.). The audio information is provided to audio analysis module 234 (e.g., the audio information from microphone 224 is also provided to a meeting or other application, etc.). Microphone 224 may be a microphone of computer device 102, while microphone 225 may be an additional microphone that remains active to capture the audio information. The audio analysis module includes an automatic speech recognition (ASR)/natural language processing (NLP) module 244. ASR/NLP module 244 may analyze the audio information and detect various scenarios that represent an interruption to user 210. For example, ASR/NLP module 244 may monitor microphones 224 and/or 225 for a local audio conversation between user 210 and interrupting entity 220. The local conversation is analyzed for an intent of user 210 to convey to interrupting entity 220 that user 210 will respond after conclusion of the meeting.

Automatic speech recognition (ASR)/natural language processing (NLP) module 244 may employ any conventional or other speech to text mechanisms (e.g., speech-to-text applications, etc.) to generate a transcript or textual representation of the conversation. The transcript may be analyzed to determine a scenario representing an interruption. ASR/NLP module 244 may further employ any conventional or other natural language processing mechanisms (e.g., entity extraction, relationship extraction, sentiment/emotion analysis, keyword extraction, part-of-speech (POS) tagger, etc.) to analyze the transcript of the conversation. For example, the interruption may be identified based on natural language processing (NLP) of the transcript to identify sentiment, emotion, specific words, or other aspects of the conversation. By way of example, specific words or phrases pertaining to a later response or unavailability of user 210 may indicate an interruption (e.g., "Let me get back to you . . . ", etc.). Further, the conversation may include sentiment or emotion indicating an interruption (e.g., the NLP may determine a score for emotion, sentiment and other attributes and indicate an interruption based on the score exceeding a score threshold, etc.).

In an embodiment, automatic speech recognition (ASR)/natural language processing (NLP) module 244 may employ a machine learning model to generate and/or analyze a transcript. The machine learning model may be implemented by any conventional or other machine learning models (e.g., mathematical/statistical, classifiers, feed-forward, recurrent, convolutional or other neural networks, etc.). By way of example, generation of the transcript and analysis of the transcript may be performed by corresponding neural networks substantially similar to the neural network described above. In this example case, the machine learning for transcript generation may be performed using a training set of audio signals for different words as input and known words as outputs, where the neural network attempts to produce the provided output (or word). In an embodiment, the audio signals and corresponding known words may be used for the training set as input. In an embodiment, feature vectors may be extracted from the audio signals and used with the corresponding known words for the training set as input.

Similarly, the machine learning for identification of interruptions may be performed using a training set of different words or phrases as input and known classifications (e.g., interruption or no interruption) as outputs, where the neural network attempts to produce the provided output (or interruption indication). In an embodiment, the words or phrases and corresponding known classifications may be used for the training set as input. In an embodiment, feature vectors may be extracted from the words or phrases and used with the corresponding known classifications for the training set as input.

The input layer of the neural network for transcript generation may receive the captured audio information or feature vectors, where the output layer of the neural network indicates the corresponding words for the transcript. The input layer of the neural network for interruption identification may receive the transcript or feature vectors, while the output layer of the neural network for interruption identification indicates a classification (e.g., interruption or no interruption, etc.) for words or phrases of the transcript.

Audio analysis module 234 generates and transmits an event (or notification) to meeting interruption module 236 indicating the presence of an interruption in response to detecting a scenario representing the interruption. The event (or notification) may include a timestamp or other time indicator for retrieval and synchronization of the audio with corresponding visual information of the interruption.

Meeting interruption module 236 monitors events (or notifications) received from visual analysis module 232 and audio analysis module 234, and correlates the events (e.g., based on the timestamps or other time indicators) to determine the presence of an interruption. The meeting interruption module is aware of a state of computer device 102 (and user 210) (e.g., do not disturb (DND), in a call/meeting, based on calendar entries, etc.). When an interruption is received while the state of computer device 102 (and user 210) indicates a meeting is in progress (e.g., in call, busy, etc.), meeting interruption module 236 captures information of the interruption, including a timestamp of the interruption, images (e.g., still images, video, etc.) of the interruption identified by visual analysis module 232, and audio of the conversation of the interruption identified by audio analysis module 234. The identity of an interrupting entity may also be captured when visual analysis module 232 is able to identify the interrupting entity based on facial recognition. In addition, contact information of the interrupting entity (e.g., e-mail address, telephone number, etc.) may be retrieved from a data source (e.g., contact card, social media platform, etc.) when the identity is determined by facial recognition.

Meeting interruption module 236 initiates storage of an interruption event in database or storage 250 including the captured visual (e.g., still images, video, etc.) and/or audio streams of the interruption, the timestamp of the interruption, and the identity and contact information of the interrupting entity when available from facial recognition. Database 250 may be local or remote from computer device 102 and meeting supervisor 104, and may store various data for interruption system 150 (e.g., visual information from visual analysis module 232, audio information from audio analysis module 234, interruption event information, contact information, etc.). In addition, when an interruption triggers an alert, meeting interruption module 236 may present an audible and/or visual alert on computer device 102 in order to enable user 210 to acknowledge entity 220. The acknowledgment may be subsequently detected as an interruption (e.g., that does not trigger an alert).

Meeting interruption module 236 retrieves and displays a list of interruption events for user 210 on a user interface (FIG. 6) when the state of computer device 102 (and user 210) indicates that the meeting has concluded and user 210 is available (e.g., out of call, free, etc.). The list of interruption events are preferably displayed in chronological order, and may include a video clip pertaining to the interruption event, and an audio clip (and/or transcript) pertaining to the interruption event. When facial recognition is able to identify an interrupting entity, the displayed list of interruption events may further include an identity (e.g., name, etc.) and contact information (e.g., contact card with e-mail, telephone number, etc.) of the interrupting entity. In addition, meeting interruption module 236 enables user 210 to interact with the displayed list of interruption events (e.g., contact the interrupting person, dismiss/delete events, etc.).

Figure 3:
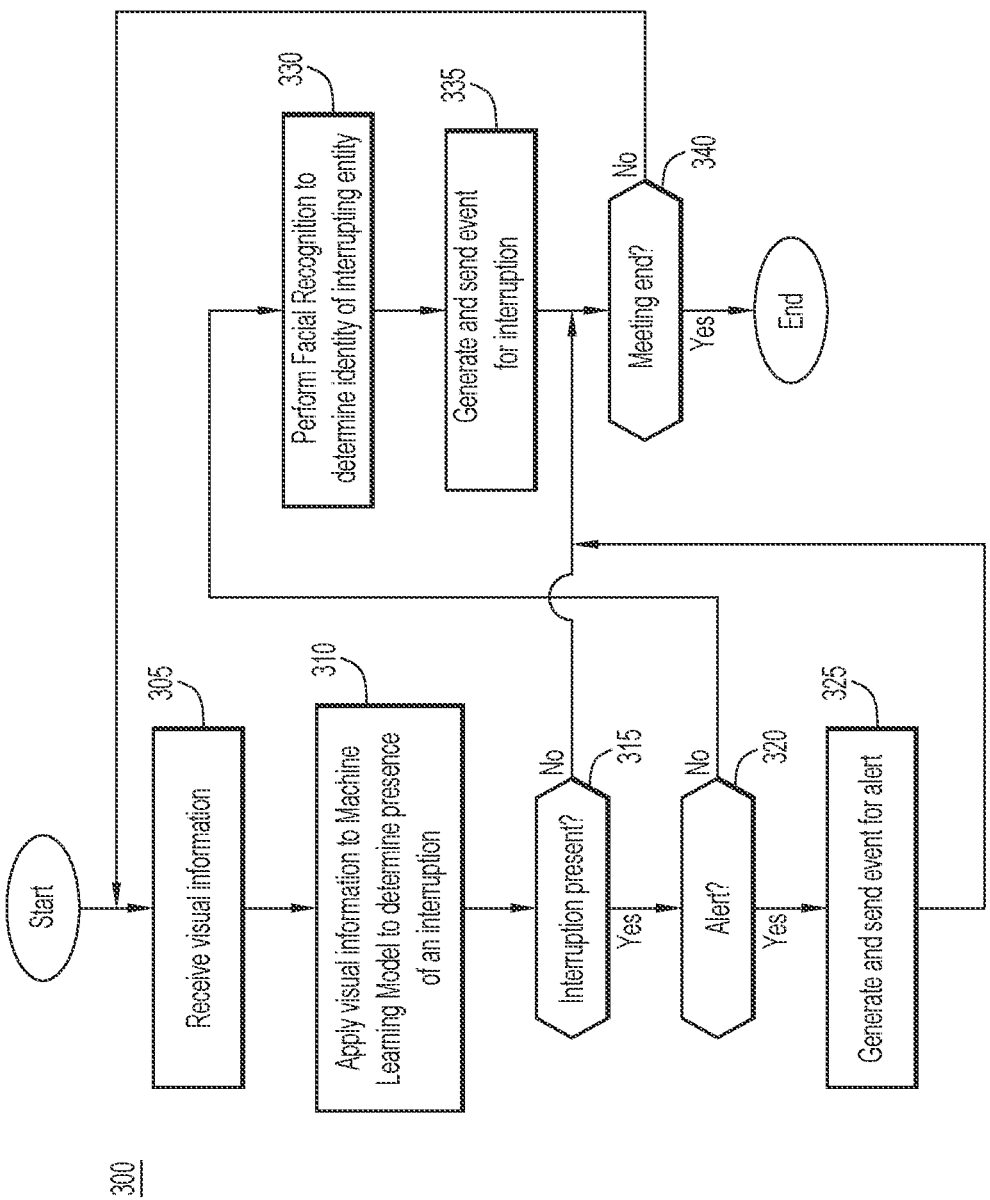
FIG. 3 is a flowchart of a method for detecting interruptions to a participant of an online meeting based on visual information, according to an example embodiment.

With continued reference to FIGS. 1 and 2, FIG. 3 illustrates a flowchart of an example method 300 for detecting interruptions to a participant of an online meeting based on visual information according to an example embodiment. While FIG. 3 is described with respect to detecting interruptions to a participant of an online meeting, it will be appreciated that the interruptions may be detected for a user performing or engaging in other activities with, or in proximity of, computer device 102 in substantially the same manner described below (e.g., using an application on computer device 102, reviewing documents, conducting a call from computer device 102 or from a calling device in proximity of computer device 102, etc.).

Initially, visual information of the participant and surrounding environment are captured by camera 226 of computer device 102. The captured visual information (including images (e.g., still images, video, etc.) of the participant and surrounding environment) is received by visual analysis module 232 at operation 305. The captured visual information may be segmented for analysis into segments of any desired time intervals (e.g., corresponding to time intervals of images/videos of the training set, etc.). The visual analysis module provides the captured visual information (or may extract and provide feature vectors of the captured visual information) to the machine learning model of computer vision (CV)/machine learning (ML) module 242 at operation 310. The machine learning model analyzes the captured visual information (or feature vectors), and provides an output (e.g., classification, probability, etc.) indicating the presence (or absence) of a scenario within the captured visual information representing an interruption to the participant and corresponding interruption type (e.g., with or without an alert) in substantially the same manner described above. Visual analysis module 232 analyzes the output of the machine learning model to determine the presence and type of an interruption (e.g., with or without an alert) at operation 315 based on the output. For example, a resulting classification to (or highest probability for) a class associated with the presence of an interruption (e.g., with or without an alert) indicates the presence of the interruption.

When an interruption is present, visual analysis module 232 determines whether the interruption should trigger an alert based on the type of interruption at operation 320. For example, an interrupting entity 220 may be detected behind user 210 without user 210 noticing entity 220. In this case, an alert may be provided to user 210 during the online meeting to inform user 210 of entity 220. When an alert should be triggered, an event (or notification) indicating triggering of the alert is generated and sent to meeting interruption module 236 at operation 325 to present an alert on computer device 102.

When the interruption does not trigger an alert as determined at operation 320, visual analysis module 232 provides the captured visual information to facial recognition module 243 to determine an identity of an entity in the background or initiating the detected interruption at operation 330. Visual analysis module 232 generates and transmits an event (or notification) to meeting interruption module 236 indicating the presence and type of the interruption (e.g., an interruption that does not trigger an alert) at operation 335. The determined identity may be also provided to meeting interruption module 236 when determined from facial recognition module 243. In addition, the event (or notification) may include a timestamp or other time indicator for retrieval and synchronization of the visual information with corresponding audio information of the interruption.

After generation of an event at operations 325, 335, or in the absence of an interruption as determined at operation 315, the above process repeats from operation 305 until the meeting ends as determined at operation 340.

Figure 4:
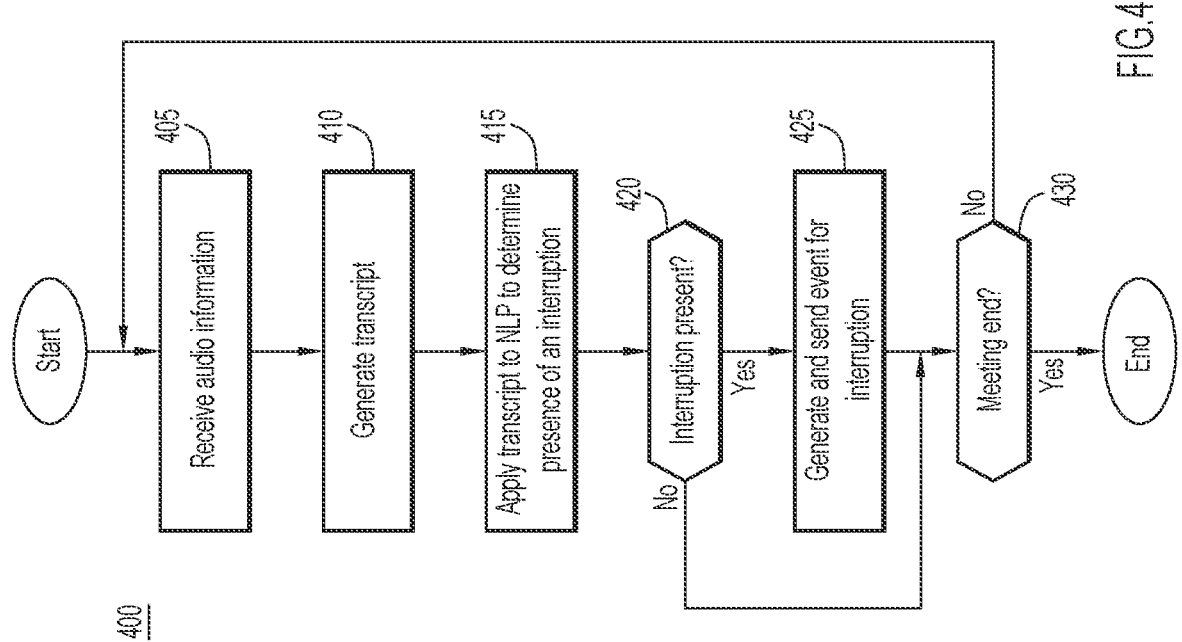
FIG. 4 is a flowchart of a method for detecting interruptions to a participant of an online meeting based on audio information, according to an example embodiment.

With continued reference to FIGS. 1-3, FIG. 4 illustrates a flowchart of an example method 400 for detecting interruptions to a participant of an online meeting based on audio information according to an example embodiment. While FIG. 4 is described with respect to detecting interruptions to a participant of an online meeting, it will be appreciated that the interruptions may be detected for a user performing or engaging in other activities with, or in proximity of, computer device 102 in substantially the same manner described below (e.g., using an application on computer device 102, reviewing documents, conducting a call from computer device 102 or from a calling device in proximity of computer device 102, etc.).

Initially, sound of the participant and surrounding environment are captured by microphone 224 of computer device 102 and/or microphone 225 to produce audio information. The audio information (e.g., including audio of a local conversation) is received by audio analysis module 234 at operation 405. The audio information may be segmented for analysis into segments of any desired time intervals (e.g., corresponding to time intervals of the corresponding images/videos, etc.). The audio analysis module provides the audio information to automatic speech recognition (ASR)/natural language processing (NLP) module 244 that generates a transcript of the conversation at operation 410 in substantially the same manner described above. The ASR/NLP module analyzes the transcript at operation 415 to determine presence of a scenario representing an interruption in substantially the same manner described above. For example, the interruption may be identified based on natural language processing (NLP) of the transcript to identify sentiment, emotion, specific words, or other aspects of the conversation in substantially the same manner described above.

Audio analysis module 234 determines whether an interruption is present at operation 420. When an interruption is present, audio analysis module 234 generates and transmits an event (or notification) to meeting interruption module 236 indicating the presence of an interruption at operation 425. In addition, the event (or notification) may include a timestamp or other time indicator for retrieval and synchronization of the audio information with corresponding visual information (e.g., still images, video, etc.) of the interruption.

After generation of the event at operation 425, or in the absence of an interruption as determined at operation 420, the above process repeats from operation 405 until the meeting ends as determined at operation 430.

Figure 5:
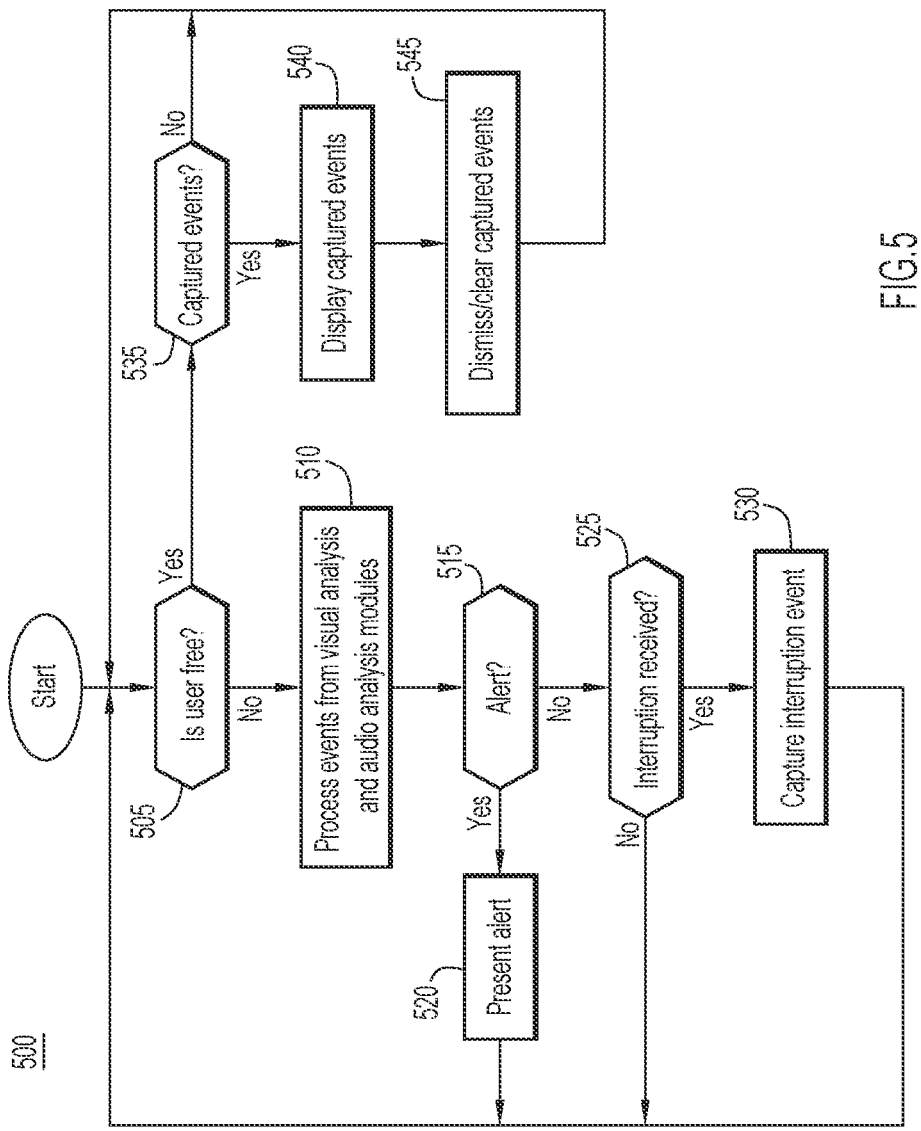
FIG. 5 is a flowchart of a method for detecting and managing interruptions to a participant of an online meeting, according to an example embodiment.

With continued reference to FIGS. 1-4, FIG. 5 illustrates a flowchart of an example method 500 for detecting and managing interruptions to a participant of an online meeting according to an example embodiment. While FIG. 5 is described with respect to detecting and managing interruptions to a participant of an online meeting, it will be appreciated that the interruptions may be detected and managed for a user performing or engaging in other activities with, or in proximity of, computer device 102 in substantially the same manner described below (e.g., using an application on computer device 102, reviewing documents, conducting a call from computer device 102 or from a calling device in proximity of computer device 102, etc.).

Initially, a participant joins an online meeting through a computer device 102, and a corresponding status is set or received by the computer device indicating unavailability of the participant.

During the meeting, meeting interruption module 236 determines the status of the participant at operation 505. When the participant is participating in the online meeting, visual information of the user and surrounding environment are captured by camera 226 of computer device 102 and processed by visual analysis module 232 to generate events (or notifications) of interruptions and their corresponding types (e.g., interruptions with or without an alert) in substantially the same manner described above. Similarly, sound of the user and surrounding environment is captured by microphone 224 of computer device 102 and/or microphone 225 to produce audio information that is processed by audio analysis module 234 to generate events (or notifications) of interruptions in substantially the same manner described above.

Meeting interruption module 236 processes interruption events from visual analysis module 232 and audio analysis module 234 at operation 510 to determine the presence and type of an interruption (e.g., an interruption with or without an alert). Meeting interruption module 236 determines whether an interruption triggering an alert is present at operation 515 based on the received events (or notifications). For example, an interrupting entity 220 may be detected behind user 210 without the user noticing entity 220. In this case, an alert may be provided to user 210 during the online meeting to inform user 210 of entity 220. When an alert should be triggered, the alert is generated and presented to the participant on computer device 102 at operation 520 to inform and enable the participant to acknowledge an interrupting entity. The acknowledgment may be subsequently detected as an interruption (e.g., an interruption without an alert). The alert may be any audible and/or visual alert (e.g., sound, beep, icon, message, etc.) to indicate presence of an entity.

The presence of an interruption without triggering an alert is determined at operation 525. In an embodiment, the event (or notification) from visual analysis module 232 may be sufficient to verify the presence of the interruption based on the visual information. In an embodiment, the event (or notification) from audio analysis module 234 may be sufficient to verify the presence of the interruption based on the audio information (e.g., when an interrupting entity is outside a view of the camera, etc.).

In an embodiment, the event (or notification) from visual analysis module 232 may need corroboration from an event (or notification) from audio analysis module 234. For example, the event (or notification) from visual analysis module 232 may indicate the interruption with a lower confidence (e.g., a probability that does not satisfy a threshold). In this example case, a corresponding event from audio analysis module 234 may be analyzed to determine the presence of the interruption. By way of further example, the visual information may indicate a very quick change of position of a user (e.g., a quick head turn, etc.) which may indicate an interruption (e.g., without an alert) with lower confidence or probability. However, the audio information corresponding to the position change may indicate an interruption (e.g., language indicating a user is to respond to an interrupting entity at a later time, etc.), thereby enabling the combination of the visual information and audio information to determine the presence of the interruption. Meeting interruption module 236 may use the timestamps or other time indicators within the events (or notifications) to identify events from visual analysis module 232 corresponding to events from audio analysis module 234 (e.g., to correlate visual and audio information of a same interruption, etc.).

Meeting interruption module 236 may employ rules indicating various conditions for determining the presence of interruptions (e.g., probability thresholds, combinations of interruption events, etc.). For example, a rule may indicate that an event (or notification) from visual analysis module 232 is sufficient to verify the presence of the interruption, that an event (or notification) from audio analysis module 234 is sufficient to verify the presence of the interruption, and/or any combination of events (or notifications) from visual analysis module 232 and audio analysis module 234 is sufficient to verify the presence of the interruption.

When an interruption is present that does not trigger an alert as determined at operation 525, information pertaining to the interruption is captured at operation 530. In an embodiment, meeting interruption module 236 captures information of the interruption (e.g., from the events or notifications, database 250, etc.), including a timestamp of the interruption, images (e.g., still images, video, etc.) of the interruption identified by visual analysis module 232, and/or audio of the conversation of the interruption identified by audio analysis module 234. In an embodiment, the audio of the interruption is captured when the audio indicates the presence of the interruption. The identity of an interrupting entity may also be captured when visual analysis module 232 is able to identify the interrupting entity based on facial recognition module 243. In addition, contact information of the interrupting entity may be retrieved from a data source (e.g., contact card, social media platform, etc.) when the identity is determined by facial recognition. The meeting interruption module initiates storage of an interruption event in database 250 including the captured visual (e.g., still images, video, etc.) and/or audio streams of the interruption, the timestamp of the interruption, and the identity and contact information of the interrupting entity (e.g., based on results of the facial recognition).

When an interruption event is not received from visual analysis module 232 and audio analysis module 234 as determined at operations 515, 525, or after presenting the alert at operation 520 or capturing the interruption information at operation 530, the process repeats from operation 505 until the user is available (e.g., at the end of the meeting, etc.).

When the meeting ends, the status of the user changes to indicate the user is available. When the user is available as determined at operation 505, meeting interruption module 236 determines the presence of captured interruption events in database 250 at operation 535. When captured interruption events are present, meeting interruption module 236 retrieves the captured interruption events from database 250 and displays the captured interruption events on a user interface of computer device 102 (FIG. 6) at operation 540. The captured interruption events are preferably displayed in chronological order, and may include a video clip pertaining to the interruption event, and an audio clip (and/or transcript) pertaining to the interruption event. When facial recognition is able to identify an interrupting entity, the displayed captured interruption events may further include an identity and contact information of the interrupting entity.

Meeting interruption module 236 further enables the user to interact with the displayed interruption events at operation 545 (e.g., contact an interrupting person from computer device 102, dismiss/clear/delete displayed interruption events, etc.). The above process repeats from operation 505 as described above based on availability of the user.

Figure 6:
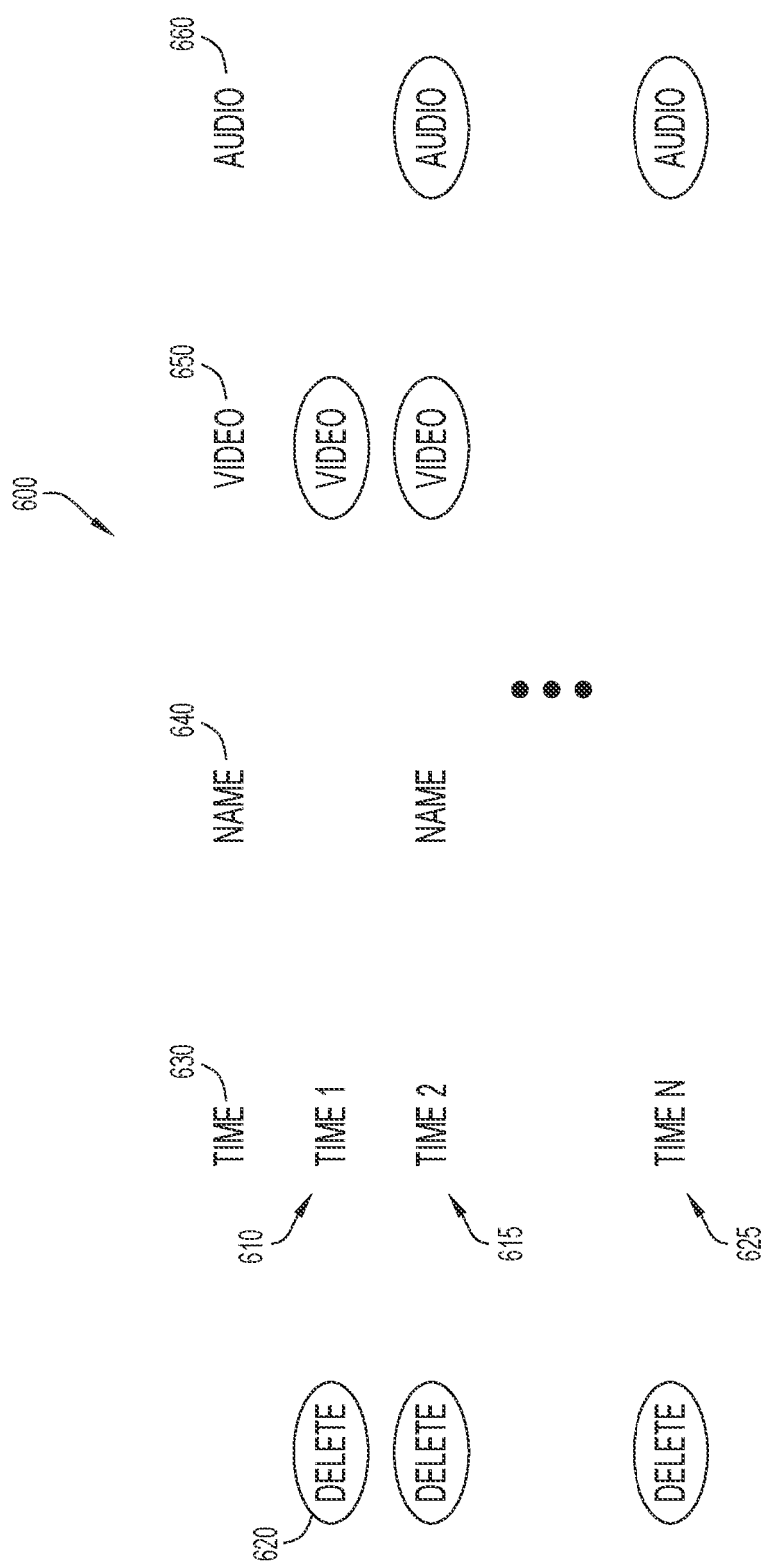
FIG. 6 illustrates an example user interface for managing interruptions to a participant of an online meeting, according to an example embodiment.

With continued reference to FIGS. 1-5, FIG. 6 illustrates an example user interface 600 for managing interruptions to a participant of an online meeting, according to an example embodiment. While FIG. 6 is described with respect to managing interruptions to a participant of an online meeting, it will be appreciated that the interruptions may be managed for a user performing or engaging in other activities with, or in proximity of, computer device 102 in substantially the same manner described below (e.g., using an application on computer device 102, reviewing documents, conducting a call from computer device 102 or from a calling device in proximity of computer device 102, etc.).

User interface 600 is presented on computer device 102 of the participant, preferably after the online meeting concludes and prior to a next meeting. The user interface presents information pertaining to interruptions to the participant by various entities during the online meeting. Meeting interruption module 236 may retrieve interruption information (or captured interruption events) from database 250 for presentation on user interface 600.

In an embodiment, the user interface may present interruption information in the form of a table with an entry (or row) for each corresponding interruption. Each entry includes a delete field 620, a time field 630, a name field 640, a video field 650, and an audio field 660. Delete field 620 includes an actuator enabling deletion of the corresponding entry. Time field 630 includes a timestamp or other time indicator (e.g., date, time, etc.) indicating a time of occurrence of the corresponding interruption. Name field 640 includes a name or identity of an interrupting entity (from facial recognition) of the corresponding interruption. Video field 650 includes an actuator enabling video pertaining to the corresponding interruption to be presented, while audio field 660 includes an actuator enabling audio (and/or a transcript of the audio) pertaining to the corresponding interruption to be presented. This may enable the participant to recall the interrupting entity and/or associated topic of the corresponding interruption. The audio field may be empty (or blank) for an entry of a corresponding interruption when the audio information fails to detect the corresponding interruption. Similarly, the video field may be empty (or blank) for an entry of a corresponding interruption when the visual information fails to detect the corresponding interruption.

The name field may be empty (or blank) for an entry of a corresponding interruption when facial recognition fails to determine an identity of an interrupting entity for the corresponding interruption. The name field may be presented in the form of a link or actuator to enable contact information or a contact card of the interrupting entity (e.g., including an e-mail address, telephone number, chat identifier, etc.) to be presented. The contact information or contact card may include various actuators or links that enable an e-mail message to be composed and sent from computer device 102 to the interrupting entity, a call to be initiated from computer device 102 to the interrupting entity, a chat session to be initiated with the interrupting entity, and/or an appointment or time to be scheduled on the calendar of the interrupting entity. However, the user interface may present any other information for an interruption and/or enable any actions to correspond with an interrupting entity (e.g., initiate a chat, call, and/or e-mail to an interrupting entity, place entries on a calendar of the interrupting entity, etc.).

By way of example, user interface 600 may include entries 610, 615, and 625. Entry 610 corresponds to an interruption detected by the visual information for which facial recognition fails to determine an identity of an interrupting entity. In this case, entry 610 includes a time indication (e.g., TIME 1 as viewed in FIG. 6) in time field 630, and an actuator in video field 650 to present video pertaining to the corresponding interruption. Audio field 660 is empty (or blank) for entry 610 since the interruption was detected by visual information. In addition, since facial recognition fails to determine an identity of an interrupting entity, name field 640 is empty (or blank) for entry 610. Delete field 620 of entry 610 includes an actuator to delete or dismiss entry 610 (and the corresponding interruption).

Entry 615 corresponds to an interruption detected by visual information and audio information, and for which facial recognition determines an identity of an interrupting entity. In this case, entry 615 includes a time indication (e.g., TIME 2 as viewed in FIG. 6) in time field 630, an actuator in video field 650 to present video pertaining to the corresponding interruption, and an actuator in audio field 660 to present audio (and/or a transcript of the audio) pertaining to the corresponding interruption. Since facial recognition determines an identity of an interrupting entity, entry 615 includes a name of the interrupting entity (e.g., NAME as viewed in FIG. 6) in name field 640. The name field is presented in the form of a link or actuator to enable contact information or a contact card of the interrupting entity (e.g., including an e-mail address, telephone number, chat identifier, etc.) to be presented. Delete field 620 of entry 615 includes an actuator to delete or dismiss entry 615 (and the corresponding interruption).

Entry 625 corresponds to an interruption detected by the audio information. In this case, entry 625 includes a time indication (e.g., TIME N as viewed in FIG. 6) in time field 630, and an actuator in audio field 660 to present audio (and/or a transcript of the audio) pertaining to the corresponding interruption. Name field 640 and video field 650 are empty (or blank) for entry 625 since the interruption was detected by audio information (e.g., facial recognition was not employed, etc.). Delete field 620 of entry 625 includes an actuator to delete or dismiss entry 625 (and the corresponding interruption).

Figure 7:
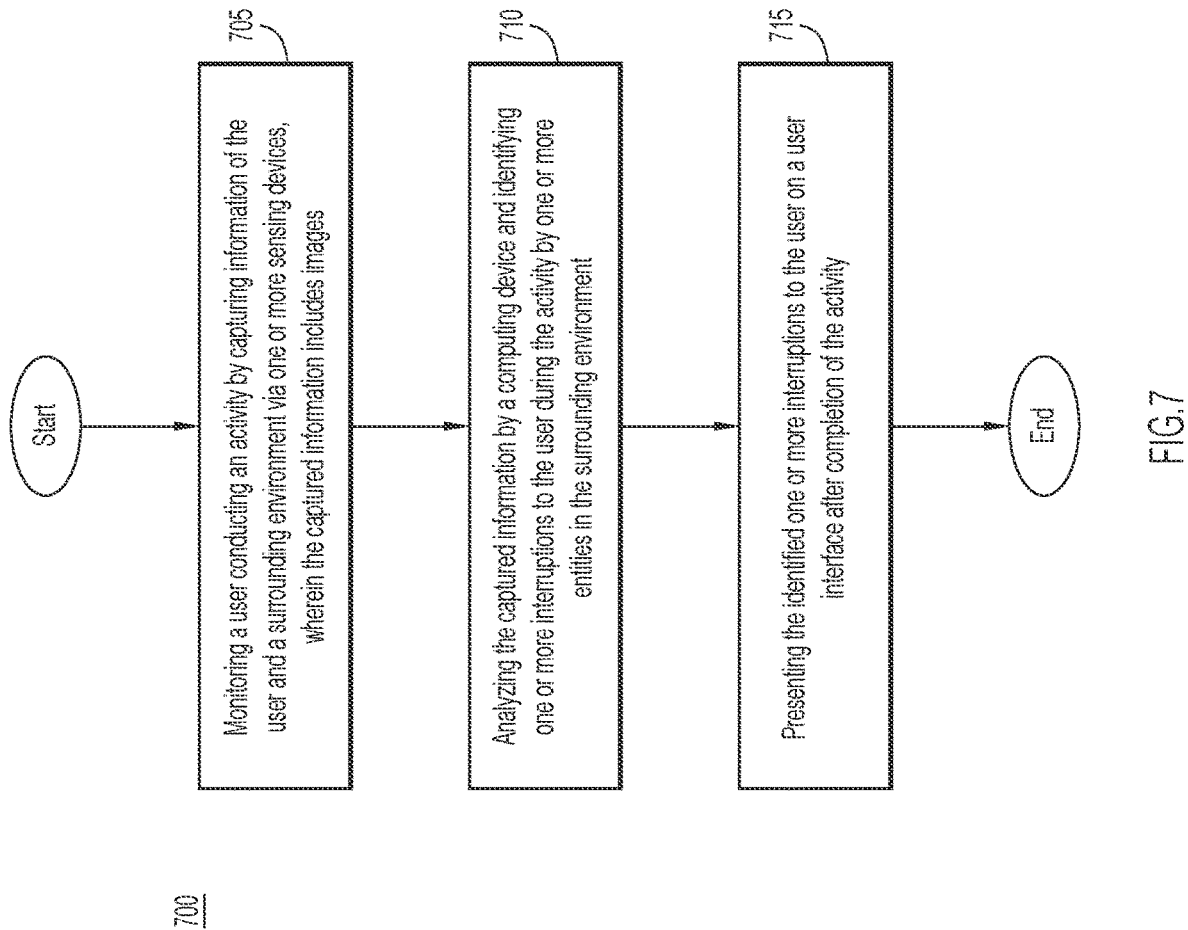
FIG. 7 illustrates a flowchart of a generalized method for detecting and managing interruptions to a user performing an activity, according to an example embodiment.

FIG. 7 is a flowchart of an example method 700 for enabling detection and management of interruptions to a user performing an activity according to an example embodiment. At operation 705, a user conducting an activity is monitored by capturing information of the user and a surrounding environment via one or more sensing devices, wherein the captured information includes images. At operation 710, the captured information is analyzed by a computing device, and one or more interruptions to the user during the activity by one or more entities in the surrounding environment are identified. At operation 715, the identified one or more interruptions to the user are presented on a user interface after completion of the activity.

Figure 8:
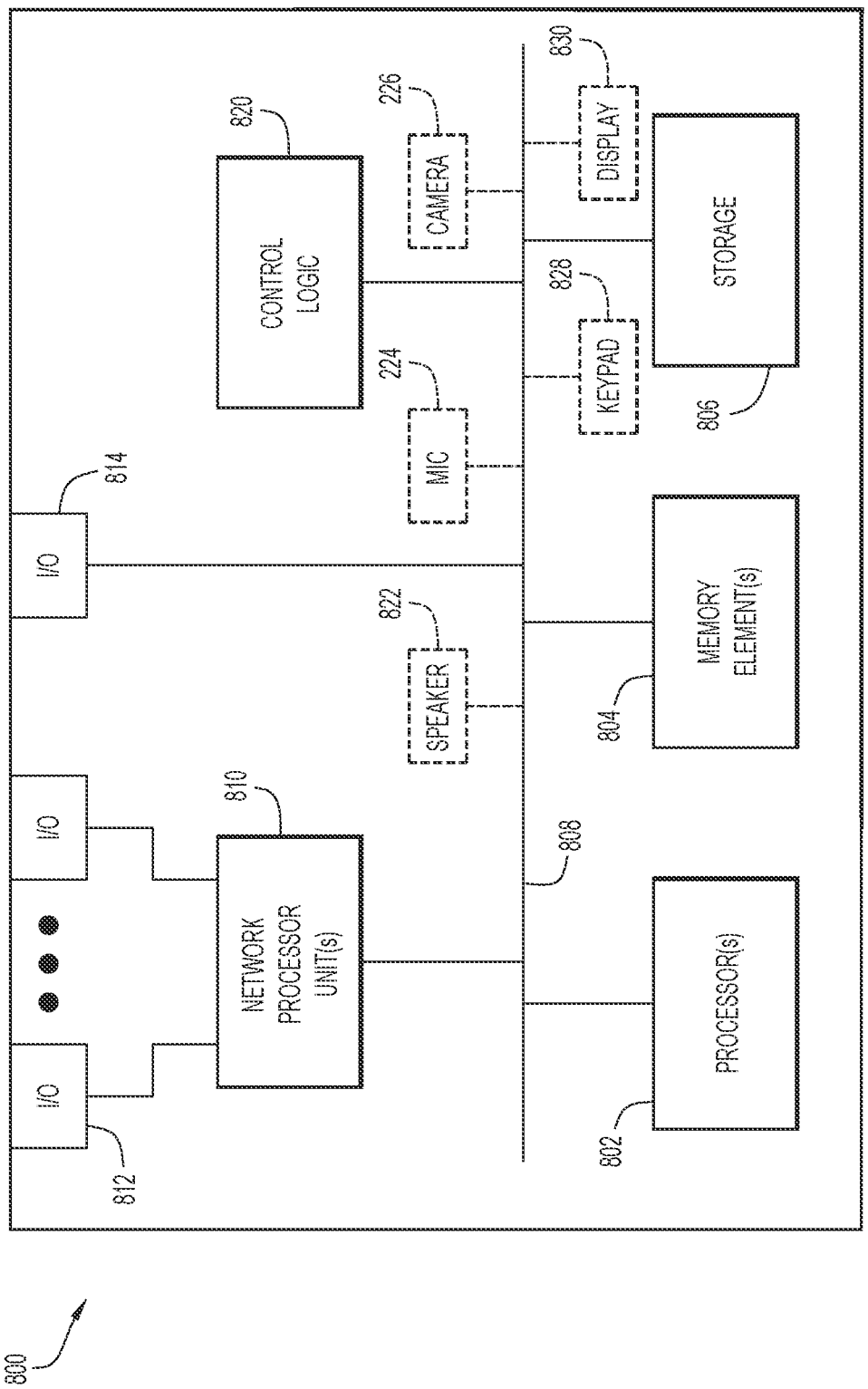
FIG. 8 illustrates a hardware block diagram of a computing device configured to perform functions associated with detecting and managing interruptions to a user performing an activity as discussed herein, according to an example embodiment.

Referring to FIG. 8, FIG. 8 illustrates a hardware block diagram of a computing device 800 that may perform functions associated with operations discussed herein in connection with the techniques depicted in FIGS. 1-7. In various embodiments, a computing device or apparatus, such as computing device 800 or any combination of computing devices 800, may be configured as any device entity/entities (e.g., computer devices, meeting supervisor or other server systems, endpoint devices, etc.) as discussed for the techniques depicted in connection with FIGS. 1-7 in order to perform operations of the various techniques discussed herein.

In at least one embodiment, computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interfaces 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, etc.), computing device 800 may further include, or be coupled to, a speaker 822 to convey sound, microphone or other sound sensing device 224, camera or image capture device 226, a keypad or keyboard 828 to enter information (e.g., alphanumeric information, etc.), and/or a touch screen or other display 830. These items may be coupled to bus 808 or I/O interface(s) 814 to transfer data with other elements of computing device 800.

In various embodiments, control logic 820 can include instructions that, when executed, cause processor(s) 802 to perform operations, which can include, but not be limited to, providing overall control operations of computing device 800; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, interruption system 150 monitors the user and surrounding environment in real-time, thereby enabling detection of interruptions as they occur. In an embodiment, the machine learning model of computer vision (CV)/machine learning module 242 may learn complex combinations of user and/or entity attributes with respect to interruptions (e.g., actions or motions, gestures, reactions, focus or gaze, etc.), thereby increasing detection accuracy and reducing false positives. This reduces consumption of processing and memory/storage resources to improve computing performance. In an embodiment, the interruption system may reside on an end-user device to detect interruptions during an online meeting (or other online activity). This offloads processing from a meeting or server system, and enables the online meeting (or other online activity) and interruption detection and management to be performed (e.g., in parallel) without degrading performance of the online meeting (or other online activity).

In an embodiment, the machine learning model of computer vision (CV)/machine learning module 242 may be continuously updated (or trained) based on feedback related to detected interruptions. For example, an interruption may be detected within visual information (e.g., with lower confidence or probability) that needs corroboration from audio information. Once the audio information corroborates the interruption of the visual information to verify the interruption, the machine learning model may be updated (or trained) based on the verified interruption. By way of example, visual information of the verified interruption is used to update or train the machine learning model to positively identify the interruption without need of corroboration by audio information (e.g., update or train the machine learning model to increase the probability (or change a classification) of the scenario representing the verified interruption, etc.). Thus, the machine learning model may continuously evolve (or be trained) to learn further user and/or entity attributes with respect to interruptions (e.g., actions or motions, gestures, reactions, focus or gaze, etc.) as interruptions are detected (or verified).

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory elements 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly be connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: monitoring a user conducting an activity by capturing information of the user and a surrounding environment via one or more sensing devices, wherein the captured information includes images; analyzing the captured information by a computing device and identifying one or more interruptions to the user during the activity by one or more entities in the surrounding environment; and presenting the identified one or more interruptions to the user on a user interface after completion of the activity.

In one example, the activity includes an online meeting.

In one example, the captured information further includes audio, and an interruption is identified from the captured information based on the audio corroborating occurrence of the interruption indicated by the images.

In one example, an interruption is identified from the captured information based on one or more from a group of: motion of the user, position of the user, a gesture by the user, a gesture by the one or more entities, and a reaction to the user by the one or more entities.

In one example, the method of further comprises: performing facial recognition of an entity in the captured information for an identified interruption to determine an identity of the entity; and retrieving contact information for the entity based on the determined identity.

In one example, presenting the identified one or more interruptions further comprises listing the identified one or more interruptions chronologically on the user interface, wherein information for a listed interruption includes one or more from a group of a video clip of the listed interruption, an audio clip of the listed interruption, a transcript of the audio clip, and the contact information of an entity associated with the listed interruption.

In one example, the method further comprises presenting an alert to the user during the activity when the analysis of the captured information indicates that an entity is located in the surrounding environment without being noticed by the user.

In another form, an apparatus is provided. The apparatus comprises: a computing system comprising one or more processors, wherein the one or more processors are configured to: monitor a user conducting an activity based on information of the user and a surrounding environment captured via one or more sensing devices, wherein the captured information includes images; analyze the captured information and identify one or more interruptions to the user during the activity by one or more entities in the surrounding environment; and present the identified one or more interruptions to the user on a user interface after completion of the activity.

In another form, one or more non-transitory computer readable storage media are provided. The non-transitory computer readable storage media are encoded with processing instructions that, when executed by one or more processors, cause the one or more processors to: monitor a user conducting an activity based on information of the user and a surrounding environment captured via one or more sensing devices, wherein the captured information includes images; analyze the captured information and identify one or more interruptions to the user during the activity by one or more entities in the surrounding environment; and present the identified one or more interruptions to the user on a user interface after completion of the activity.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   monitoring a user conducting an activity by capturing information of the user and a surrounding environment via one or more sensing devices, wherein the captured information includes images;
   analyzing the captured information by a computing device and identifying one or more interruptions to the user during the activity by one or more entities in the surrounding environment; and
   presenting the identified one or more interruptions to the user on a user interface after completion of the activity.

2. The method of claim 1, wherein the activity includes an online meeting.

3. The method of claim 1, wherein the captured information further includes audio, and an interruption is identified from the captured information based on the audio corroborating occurrence of the interruption indicated by the images.

4. The method of claim 2, wherein an interruption is identified from the captured information based on one or more from a group of: motion of the user, position of the user, a gesture by the user, a gesture by the one or more entities, and a reaction to the user by the one or more entities.

5. The method of claim 2, further comprising:
   performing facial recognition of an entity in the captured information for an identified interruption to determine an identity of the entity; and
   retrieving contact information for the entity based on the determined identity.

6. The method of claim 5, wherein presenting the identified one or more interruptions further comprises:
   listing the identified one or more interruptions chronologically on the user interface, wherein information for a listed interruption includes one or more from a group of a video clip of the listed interruption, an audio clip of the listed interruption, a transcript of the audio clip, and the contact information of an entity associated with the listed interruption.

7. The method of claim 2, further comprising:
   presenting an alert to the user during the activity when the analyzing of the captured information indicates that an entity is located in the surrounding environment without being noticed by the user.

8. An apparatus comprising:
   a computing system comprising one or more processors, wherein the one or more processors are configured to:
      monitor a user conducting an activity based on information of the user and a surrounding environment captured via one or more sensing devices, wherein the captured information includes images;
      analyze the captured information and identify one or more interruptions to the user during the activity by one or more entities in the surrounding environment; and
      present the identified one or more interruptions to the user on a user interface after completion of the activity.

9. The apparatus of claim 8, wherein the activity includes an online meeting.

10. The apparatus of claim 8, wherein the captured information further includes audio, and an interruption is identified from the captured information based on the audio corroborating occurrence of the interruption indicated by the images.

11. The apparatus of claim 9, wherein an interruption is identified from the captured information based on one or more from a group of: motion of the user, position of the user, a gesture by the user, a gesture by the one or more entities, and a reaction to the user by the one or more entities.

12. The apparatus of claim 9, wherein the one or more processors are further configured to:
    perform facial recognition of an entity in the captured information for an identified interruption to determine an identity of the entity;
    retrieve contact information for the entity based on the determined identity; and
    list the identified one or more interruptions chronologically on the user interface, wherein information for a listed interruption includes one or more from a group of a video clip of the listed interruption, an audio clip of the listed interruption, a transcript of the audio clip, and the contact information of an entity associated with the listed interruption.

13. The apparatus of claim 9, wherein the one or more processors are further configured to:
    present an alert to the user during the activity when analysis of the captured information indicates that an entity is located in the surrounding environment without being noticed by the user.

14. One or more non-transitory computer readable storage media encoded with processing instructions that, when executed by one or more processors, cause the one or more processors to:
    monitor a user conducting an activity based on information of the user and a surrounding environment captured via one or more sensing devices, wherein the captured information includes images;
    analyze the captured information and identify one or more interruptions to the user during the activity by one or more entities in the surrounding environment; and
    present the identified one or more interruptions to the user on a user interface after completion of the activity.

15. The one or more non-transitory computer readable storage media of claim 14, wherein the activity includes an online meeting.

16. The one or more non-transitory computer readable storage media of claim 14, wherein the captured information further includes audio, and an interruption is identified from the captured information based on the audio corroborating occurrence of the interruption indicated by the images.

17. The one or more non-transitory computer readable storage media of claim 15, wherein an interruption is identified from the captured information based on one or more from a group of: motion of the user, position of the user, a gesture by the user, a gesture by the one or more entities, and a reaction to the user by the one or more entities.

18. The one or more non-transitory computer readable storage media of claim 15, wherein the processing instructions further cause the one or more processors to:
    perform facial recognition of an entity in the captured information for an identified interruption to determine an identity of the entity; and
    retrieve contact information for the entity based on the determined identity.

19. The one or more non-transitory computer readable storage media of claim 18, wherein presenting the identified one or more interruptions further comprises:
    listing the identified one or more interruptions chronologically on the user interface, wherein information for a listed interruption includes one or more from a group of a video clip of the listed interruption, an audio clip of the listed interruption, a transcript of the audio clip, and the contact information of an entity associated with the listed interruption.

20. The one or more non-transitory computer readable storage media of claim 15, wherein the processing instructions further cause the one or more processors to:
present an alert to the user during the activity when analysis of the captured information indicates that an entity is located in the surrounding environment without being noticed by the user.

* * * * *